UNITED STATES PATENT OFFICE.

DAVID H. PRIEST, OF EVERETT, MASSACHUSETTS.

COMPOSITION FOR ROOFING.

SPECIFICATION forming part of Letters Patent No. 266,196, dated October 17, 1882.

Application filed July 29, 1882. (No specimens.)

*To all whom it may concern:*

Be it known that I, DAVID H. PRIEST, a citizen of the United States, residing at Everett, in the county of Middlesex and State of Massachusetts, have invented a new, useful, and Improved Composition for Roofing, of which the following is a specification.

My composition consists of the following ingredients, combined substantially in the following proportions, viz: I take five or six parts of coal-tar or gas-oil and from eight to twelve parts of resin and place the coal-tar or gas-oil and resin in a kettle to be heated and heat them together until the same are dissolved. I then add about a pound of muriate of soda and heat the mixture to the boiling-point. I then mix in, carefully and thoroughly, about eighty-three parts of ground or pulverized soapstone. The composition is then ready for use upon roofs and buildings in the ordinary way of applying roofing cements or compositions—that is to say, the roof is boarded in the ordinary way, and I then cover the same with paper, tarred or otherwise, and fasten on the paper by means of nails driven through circular pieces of tin placed outside of the paper; or I may use any other suitable fastening for the paper. I then lay on the composition by a trowel, as I would mortar, the thickness of a quarter of an inch, and after the same is laid I smooth the whole with a roller.

The composition can be laid easier and to better advantage by laying it on when warm or hot, although it can be laid when cooled. The adhesive power of the composition is such that the roof may be of any pitch or angle, and even it will lay equally well on a perpendicular boarded side of a building, the same being prepared as above. It will not run from the roof into the gutter, and will not sag or crack, is not affected by heat or cold, so as to swell or contract, thus causing cracks, which is the cause of leakage in all cements. It will, from the nature of soapstone, keep the space or room under the roof many degrees cooler in hot weather than any composition or cement now in use.

I am not confined to the exact proportions herein set forth, but find the best general results from about these proportions.

I am aware that composition for roofing has been heretofore prepared from petroleum, resin, and soapstone; but I have discovered that coal-tar or gas-oil is its superior for roofing purposes in every respect; it is less liable to explode and ignite, because it contains little or no gasoline; it oxygenizes, dries, and hardens quicker than petroleum, is cheaper, and can be handled with less danger in preparing the composition. Muriate of soda renders the composition fire-proof, resin renders or gives it adhesive power, coal-tar or gas oil keeps it waxy, and soapstone makes the composition plastic and suitable for application to roofs and buildings.

What I claim as my invention, and desire to secure by Letters Patent, is—

A composition for roofing, consisting of coal-tar or gas-oil, resin, muriate of soda, and soapstone, combined substantially in the proportions and in the manner and for the purpose specified.

DAVID H. PRIEST.

Witnesses:
J. L. NEWTON,
ROBERT F. NAYLOR.